US009852341B2

United States Patent
Zhou et al.

(10) Patent No.: US 9,852,341 B2
(45) Date of Patent: Dec. 26, 2017

(54) METHOD AND SYSTEM FOR DETECTING MOVING OBJECTS

(71) Applicant: Harman International Industries, Inc, Stamford, CT (US)

(72) Inventors: Yun Zhou, Shanghai (CN); Chuyang Hong, Shanghai (CN); Yankun Zhang, Shanghai (CN); Norman Weyrich, Shanghai (CN)

(73) Assignee: HARMAN INTERNATIONAL INDUSTRIES, INCORPORATION, Stamford, CT (US)

(*) Notice: Subject to any disclaimer, the term of this patent is extended or adjusted under 35 U.S.C. 154(b) by 0 days.

(21) Appl. No.: 14/765,546

(22) PCT Filed: Feb. 4, 2013

(86) PCT No.: PCT/CN2013/071335
§ 371 (c)(1),
(2) Date: Aug. 3, 2015

(87) PCT Pub. No.: WO2014/117403
PCT Pub. Date: Aug. 7, 2014

(65) Prior Publication Data
US 2015/0379354 A1    Dec. 31, 2015

(51) Int. Cl.
*G06K 9/00* (2006.01)
*G06T 7/246* (2017.01)

(52) U.S. Cl.
CPC ........ *G06K 9/00711* (2013.01); *G06T 7/246* (2017.01); *G06T 2207/10016* (2013.01);
(Continued)

(58) Field of Classification Search
None
See application file for complete search history.

(56) References Cited

U.S. PATENT DOCUMENTS

| 8,249,299 | B1 | 8/2012 | Dhawan et al. |
| 8,446,468 | B1 * | 5/2013 | Medioni ............. G06T 7/003 348/144 |

(Continued)

FOREIGN PATENT DOCUMENTS

| CN | 102111530 A | 6/2011 |
| CN | 102741884 A1 | 10/2012 |

(Continued)

OTHER PUBLICATIONS

International Search Report Application No. PCT/CN2013/071335, dated Sep. 19, 2013.
Zhang et al., "A Single Camera Based Rear Obstacle Detection System", 2011 IEEE Intelligent Vehicles Symposium (IV) Baden-Baden, Germany, Jun. 5-9, 2011, 6 pages.
Zhu et al., "Mosaic Panorama Technique for Videos", Department of Information and Electronic Engineering, Zhejang University Hangzhou 310027, Aug. 11, 2006, 6 pages.
(Continued)

*Primary Examiner* — Delomia L Gilliard
(74) *Attorney, Agent, or Firm* — Artegis Law Group, LLP (57) ABSTRACT

A moving objects detection method is disclosed. The method may include: identifying a plurality of feature points based on a plurality of video frames; selecting from the plurality of feature points to form a first and a second groups of feature points based on correlations between the plurality of feature points; and identifying in at least one video frame two segments based on the first and the second groups of feature points, respectively, as detected moving objects, where a correlation between two feature points may include a distance component and a movement difference component, where the distance component is related to a distance between the two feature points, and the movement difference component is related to a difference between corresponding movements of the two feature points. A moving objects detection system is also provided.

20 Claims, 4 Drawing Sheets

(52) U.S. Cl.
CPC ............... *G06T 2207/20076* (2013.01); *G06T 2207/30196* (2013.01); *G06T 2207/30252* (2013.01); *G06T 2207/30261* (2013.01)

(56) References Cited

U.S. PATENT DOCUMENTS

2012/0206597 A1    8/2012   Komoto et al.
2014/0146182 A1*   5/2014   Endo ................. H04N 5/23261
                                                                               348/169

FOREIGN PATENT DOCUMENTS

| CN | WO 2014117403 A1 * | 8/2014 | ........... G06T 7/2033 |
|---|---|---|---|
| JP | 2005250910 A * | 9/2005 | |
| WO | 2012001709 A2 | 1/2012 | |
| WO | 2012145819 A1 | 1/2012 | |
| WO | 2012014430 A1 | 2/2012 | |
| WO | 2012137621 A1 | 10/2012 | |

OTHER PUBLICATIONS

Extended European Search Report for Application No. 13873987, 7 pages.
Torr P H et al: "Stochastic motion 8,15 clustering", May 2, 1994 (May 2, 1994), Correct System Design; [Lecture Notes in Computer Science; Lect.Notes Computer], Springer International Publishing, CHAM, pp. 328-337, XP047289406, ISSN: 0302-9743 [retrieved on Jun. 16, 2005] abstract p. 329, paragraph 1.

\* cited by examiner

|  | G1 | G2 |
|---|---|---|
| P1 | $C_{1L1}$ | 0 |
| P2 | $C_{2L1}$ | $C_{2L2}$ |
| P3 | 0 | $C_{3L2}$ |

Table 1

METHOD AND SYSTEM FOR DETECTING MOVING OBJECTS

CROSS-REFERENCE TO RELATED APPLICATIONS

The present application is a national stage application of PCT/CN2013/071335 titled, "METHOD AND SYSTEM FOR DETECTING MOVING OBJECTS," and filed on Feb. 4, 2013. The subject matter of this related application is hereby incorporated herein by reference.

TECHNICAL FIELD

The present application generally relates to a moving objects detection method and a moving objects detection system.

BACKGROUND

Nowadays, there are many image-based detection methods to detect moving objects such as pedestrians and vehicles, and these methods can be used to detect moving objects around a vehicle and remind a driver detected moving objects, thus to decrease the chance of traffic accident. However, conventional detection methods use iteration algorithms to reduce false positives, the computation of which is complex. Therefore, a more efficient moving objects detection method and system are needed.

SUMMARY

In one embodiment, a moving objects detection method is provided. The moving objects detection method may include: identifying a plurality of feature points based on a plurality of video frames; selecting from the plurality of feature points to form a first and a second groups of feature points based on correlations between the plurality of feature points; and identifying in at least one video frame two segments based on the first and the second groups of feature points as detected moving objects, where a correlation between two feature points may include a distance component and a movement difference component, where the distance component is related to a distance between the two feature points, and the movement difference component is related to a difference between corresponding movements of the two feature points.

In some embodiments, a correlation between two feature points may be calculated according to equation (1):

$$C_{12} = \exp\left(-\frac{ds_{12}}{\sigma_{dis}} - \frac{dv_{12}}{\sigma_v}\right) \quad \text{Equation (1)}$$

where $C_{12}$ represents a correlation between two feature points $P_1$ and $P_2$;
$ds_{12}$ represents a distance between the two feature points;
$dv_{12}$ represents a movement difference of the two feature points; and
$\sigma_{dis}$ and $\sigma_v$ represent statistical variances of distance and movement, respectively.

In some embodiments, if $ds_{12}$ is greater than $\sigma_{dis}$, or if $dv_{12}$ is greater than two times of $\sigma_v$, the correlation $C_{12}$ may be set to zero. In this way, correlation calculations for feature points with "loose" relationship may be avoided, thereby reducing the load and complexity of computation.

In some embodiments, $\sigma_{dis}$ may be set to a value in the range of $\sqrt{W^2+H^2}/15$ to $\sqrt{W^2+H^2}/10$, where W represents a width of the video frames, and H represents a height of the video frames. In some embodiments, $\sigma_v$ may be set to a value in the range of 6 to 10.

In some cases, different groups may have a common feature point. In some embodiments, the method may further include: if the first and the second groups have a common feature point, classifying the common feature point into one of the first and the second group by: identifying a first base point from the first group of feature points, which has the greatest sum of correlations with the other feature points of the first group; identifying a second base point from the second group of feature points, which has the greatest sum of correlations with the other feature points of the second group; and classifying the common feature point into one of the first and the second groups whose base point has a larger correlation with the common feature point, to obtain updated first and second groups of feature points, where the two segments may be identified based on the updated first and second groups of feature points.

In some embodiments, the first base point may also be identified by: calculating for each feature point of the first group a sum of its correlations with the other feature points of the first group; identifying a predetermined proportion of feature points having the greatest sums of correlations in the first group; calculating for each feature point of the predetermined proportion of feature points a sum of its correlations with the other feature points of the predetermined proportion of feature points; and identifying the first base point which has the greatest sum of correlations with the other feature points of the predetermined proportion of feature points. The same method may be used to identify the second base point.

In some embodiments, the predetermined proportion of feature points may be a half of the number of feature points in the first group. The value of the proportion may be set according to specific conditions and requirements such as computation load etc.

In some embodiments, a fundamental matrix, which represents movement of a camera for capturing the video frames, may be used to refine the detection of moving objects. In some embodiments, the method may further include: identifying a dominant plane using RANSAC based homography; calculating the fundamental matrix based on feature points on the dominant plane; and determining whether movements of the updated first and the second groups of feature points conform to the fundamental matrix, if movements of a group of feature points conform to the fundamental matrix, categorizing the object identified based on the group of feature points as a static object.

In one embodiment, a moving objects detection method is provided. The moving objects detection method may include: identifying a plurality of feature points based on a plurality of video frames; selecting from the plurality of feature points to form a group of feature points based on correlations between the plurality of feature points; and identifying in at least one video frame a segment based on the group of feature points as a detected moving object, where a correlation between two feature points may include a distance component and a movement difference component, where the distance component is related to a distance between the two feature points, and the movement difference component is related to a difference between corresponding movements of the two feature points.

In one embodiment of the present application, a moving objects detection system is provided. The moving objects detection system may include a processing device configured to: identify a plurality of feature points based on a plurality of video frames; select from the plurality of feature points to form a first and a second groups of feature points based on correlations between the plurality of feature points; and identify in at least one video frame two segments based on the first and the second groups of feature points as detected moving objects, where a correlation between two feature points may include a distance component and a movement difference component, where the distance component is related to a distance between the two feature points, and the movement difference component is related to a difference between corresponding movements of the two feature points.

In some embodiments, the moving objects detection system may further include a camera for capturing the video frames.

In some embodiments, a correlation between two feature points may be calculated according to equation (1):

$$C_{12} = \exp\left(-\frac{ds_{12}}{\sigma_{dis}} - \frac{dv_{12}}{\sigma_v}\right) \quad \text{Equation (1)}$$

where $C_{12}$ represents a correlation between two feature points $P_1$ and $P_2$;

$ds_{12}$ represents the distance between the two feature points;

$dv_{12}$ represents the movement difference of the two feature points; and $\sigma_{dis}$ and $\sigma_v$ represent statistical variances of distance and movement, respectively.

In some embodiments, if $ds_{12}$ is greater than $\sigma_{dis}$, or if $dv_{12}$ is greater than two times of $\sigma_v$, the correlation $C_{12}$ may be set to zero. In this way, correlation calculations for feature points with "loose" relationship may be avoided, thereby reducing the load and complexity of computation.

In some embodiments, $\sigma_{dis}$ may be set to a value in the range of $\sqrt{W^2+H^2}/15$ to $\sqrt{W^2+H^2}/10$, where W represents a width of the video frames, and H represents a height of the video frames. In some embodiments, $\sigma_v$ may be set to a value in the range of 6 to 10.

In some cases, different groups may have a common feature point. In some embodiments, the processing device may be further configured to: check if the first and the second groups have a common feature point, if yes, identify a first base point from the first group of feature points, which has the greatest sum of correlations with the other feature points of the first group; identify a second base point from the second group of feature points, which has the greatest sum of correlations with the other feature points of the second group; and classify the common feature point into one of the first and the second groups whose base point has a larger correlation with the common feature point, to obtain updated first and second groups of feature points, where the two segments may be identified based on the updated first and second groups of feature points.

In some embodiments, the processing device may be further configured to: check if the first and the second groups have a common feature point, if yes, calculate for each feature point of the first group a sum of its correlations with the other feature points of the first group; identify a predetermined proportion of feature points having the greatest sums of correlations in the first group to obtain a third group of feature points; calculate for each feature point of the third group of feature points a sum of its correlations with the other feature points of the third group of feature points; identify for the first group a first base point which has the greatest sum of correlations with the other feature points of the third group of feature points; calculate for each feature point of the second group a sum of its correlations with the other feature points of the second group; identify the predetermined proportion of feature points having the greatest sums of correlations in the second group to obtain a fourth group of feature points; calculate for each feature point of the fourth group of feature points a sum of its correlations with the other feature points of the fourth group of feature points; identify for the second group a second base point which has the greatest sum of correlations with the other feature points of the fourth group of feature points; and classify the common feature point into one of the first and the second groups whose base point has a larger correlation with the common feature point, to obtain updated first and second groups of feature points, where the two segments may be identified based on the updated first and second groups of feature points.

In some embodiments, the predetermined proportion of feature points may be a half of the number of feature points in the first group. The value of the proportion may be set according to specific conditions and requirements such as computation load etc.

In some embodiments, a fundamental matrix, which represents movement of a camera for capturing the video frames, may be used to refine the detection of moving objects. In some embodiments, the processing device may be further configured to: identify a dominant plane using RANSAC based homography; calculate the fundamental matrix based on feature points on the dominant plane; and categorize an object identified based on a group of feature points as a static object if movements of the group of feature points conform to the fundamental matrix.

In one embodiment of the present application, a moving objects detection system is provided. The moving objects detection system may include a processing device configured to: identify a plurality of feature points based on a plurality of video frames; select from the plurality of feature points to form a group of feature points based on correlations between the plurality of feature points; and identify in at least one video frame a segment based on the group of feature points as a detected moving object, where a correlation between two feature points may include a distance component and a movement difference component, where the distance component is related to a distance between the two feature points, and the movement difference component is related to a difference between corresponding movements of the two feature points.

In one embodiment of the present application, a moving objects detection system is provided. The moving objects detection system may include a processing device for: identifying a plurality of feature points based on a plurality of video frames; selecting from the plurality of feature points to form a first and a second groups of feature points based on correlations between the plurality of feature points; and identifying in at least one video frame two segments based on the first and the second groups of feature points as detected moving objects, where a correlation between two feature points may include a distance component and a movement difference component, where the distance component is related to a distance between the two feature points, and the movement difference component is related to a difference between corresponding movements of the two feature points.

In one embodiment of the present application, a moving objects detection system is provided. The moving objects detection system may include a processing device for: identifying a plurality of feature points based on a plurality of video frames; selecting from the plurality of feature points to form a first and a second groups of feature points based on correlations between the plurality of feature points; checking if the first and the second group of feature points have a common feature point, if yes, identifying a first base point from the first group of feature points, which has the greatest sum of correlations with the other feature points of the first group; identifying a second base point from the second group of feature points, which has the greatest sum of correlations with the other feature points of the second group; and classifying the common feature point into one of the first and the second groups whose base point has a larger correlation with the common feature point, to obtain updated first and second groups of feature points having no common feature point; and identifying in at least one video frame two segments based on the updated first and second groups of feature points as detected moving objects, respectively.

In one embodiment of the present application, computer readable medium storing therein a computer program for detecting moving objects is provided. When the computer program is executed by a processor, the processor may be instructed to implement a moving objects detection method which includes: identifying a plurality of feature points based on a plurality of video frames; selecting from the plurality of feature points to form a first and a second groups of feature points based on correlations between the plurality of feature points; and identifying in at least one video frame two segments based on the first and the second groups of feature points as detected moving objects, where a correlation between two feature points may include a distance component and a movement difference component, where the distance component is related to a distance between the two feature points, and the movement difference component is related to a difference between corresponding movements of the two feature points.

In one embodiment of the present application, computer readable medium storing therein a computer program for detecting moving objects is provided. When the computer program is executed by a processor, the processor may be instructed to implement a moving objects detection method which includes: identifying a plurality of feature points based on a plurality of video frames; selecting from the plurality of feature points to form a group of feature points based on correlations between the plurality of feature points; and identifying in at least one video frame a segment based on the group of feature points as a detected moving object, where a correlation between two feature points may include a distance component and a movement difference component, where the distance component is related to a distance between the two feature points, and the movement difference component is related to a difference between corresponding movements of the two feature points.

In one embodiment of the present application, computer readable medium storing therein a computer program for detecting moving objects is provided. When the computer program is executed by a processor, the processor may be instructed to implement a moving objects detection method which includes: identifying a plurality of feature points based on a plurality of video frames; selecting from the plurality of feature points to form a first and a second groups of feature points based on correlations between the plurality of feature points; checking if the first and the second group of feature points have a common feature point, if yes, classifying the common feature point into the first or the second groups based on its correlations with the first and the second groups of feature points, to obtain updated first and second groups of feature points having no common feature point; and identifying in at least one video frame two segments defined by the updated first and second groups of feature points as detected moving objects.

Compared with the conventional methods, the method of the present application has lower computation complexity, thus the efficiency of moving objects detection is improved.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Figure 1:
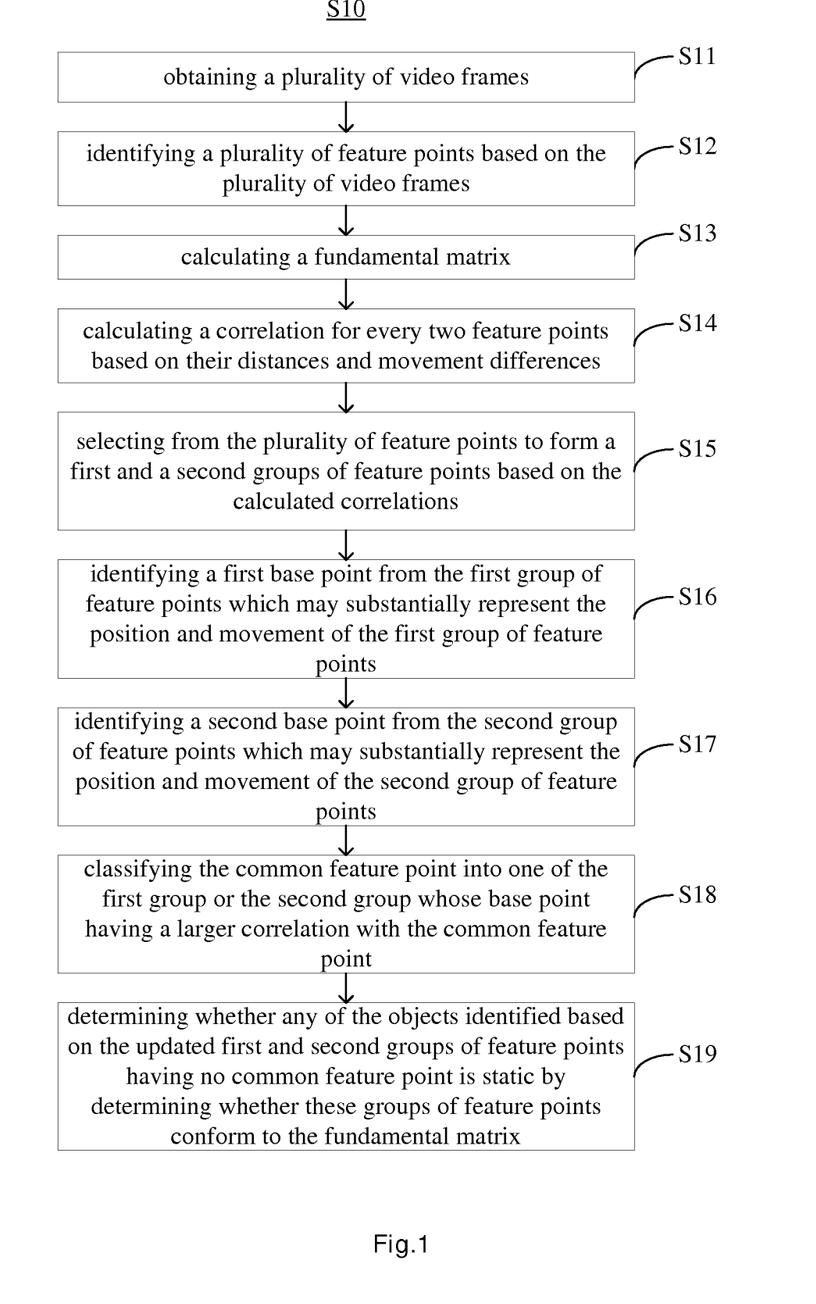
FIG. 1 illustrates a schematic flow chart of a moving objects detection method according to one embodiment of the present application.

Referring to FIG. 1, a schematic flow chart of a moving objects detection method S10 according to one embodiment of the present application is illustrated.

In S11, obtaining a plurality of video frames. In some embodiments, when the method is used to detect moving objects around a vehicle, a monocular camera mounted on the vehicle may be used to capture video frames for moving objects detection. In some embodiments, the plurality of video frames may be captured at evenly spaced time points. In some embodiments, the plurality of video frames may be captured at predetermined time intervals.

In S12, identifying a plurality of feature points based on the plurality of video frames. In some embodiments, the plurality of feature points may be identified by using feature point detection and tracking methods.

In some embodiments, a "Good Features to Track" method proposed by Tomasi and Shi may be used to detect the plurality of feature points from a video frame. In some embodiments, a Kanade-Lucas-Tomasi (KLT) tracking method may be used to track the detected feature points from the plurality of video frames. The feature point detection and tracking methods mentioned above are well known to those skilled in the art, and are not described in detail herein. Besides the "Good Features to Track" method and KLT tracking method, other feature point detection and tracking methods may be used.

In S13, calculating a fundamental matrix.

In some embodiments, a fundamental matrix, which represents movement of a camera for capturing the video frames, may be used to refine the detection of moving objects. In some embodiments, a group of static feature points may be identified using RANSAC based homography. Then movements of the camera by means of focus of expansion, which is represented by a fundamental matrix may be calculated based on the group of static feature points. As calculation of the fundamental matrix is well known in the art, it is not described in detail herein.

In S14, calculating a correlation for every two feature points based on their distances and movement differences.

In some embodiments, feature points $P_1(x_{1n}, y_{1n})$ and $P_2(x_{2n}, y_{2n})$ may be selected randomly in a video frame, where $(x_{1n}, y_{1n})$ represents coordinates of $P_1$, $(x_{2n}, y_{2n})$ represents coordinates of $P_2$, and n represents a frame index of the corresponding tracked video frame. In some embodiments, the correlation $C_{12}$ between the two feature points $P_1$ and $P_2$, may be calculated according to equation (1):

$$C_{12} = \exp\left(-\frac{ds_{12}}{\sigma_{dis}} - \frac{dv_{12}}{\sigma_v}\right) \quad \text{Equation (1)}$$

where the operator 'exp' denotes an exponential function;
$ds_{12}$ represents Euclidean distance between the two feature points $P_1$ and $P_2$, which may be given by $ds_{12}=(x_{1n}-x_{2n})^2+(y_{1n}-y_{2n})^2$;
$dv_{12}$ represents accumulated motion vector difference of the two feature points $P_1$ and $P_2$, which may be given by equation (2):

$$dv_{12} = \sum_{j=1}^{n-1} \|\vec{v}_{1j} - \vec{v}_{2j}\|$$

$$= \sum_{j=1}^{n-1} \left\{ \begin{array}{l} [(x_{1j+1}-x_{1j})-(x_{2j+1}-x_{2j})]^2 + \\ [(y_{1j+1}-y_{1j})-(y_{2j+1}-y_{2j})]^2 \end{array} \right\} \quad \text{Equation (2)}$$

where $\vec{v}_{1j}$ represents a motion vector of $P_1$ and $\vec{v}_{2j}$ represents a motion vector of $P_2$; $(x_{1j+1}, y_{1j+1})$ and $(x_{2j+1}, y_{2j+1})$ are respectively coordinates of $P_1$ and $P_2$ in a video frame with a frame index of j+1; and $(x_{1j}, y_{1j})$ and $(x_{2j}, y_{2j})$ are respectively coordinates of $P_1$ and $P_2$ in a video frame with a frame index j; and $\sigma_{dis}$ and $\sigma_v$ represents statistical variances of distance and motion vector respectively.

In some embodiments, besides Euclidean distance, $ds_{12}$ may also be sum of absolute distance (SAD) or sum of square distance (SSD). In some embodiments, $dv_{12}$ may also be I2 Norm distance of motion vectors or normalized inner product of motion vectors.

In S15, selecting from the plurality of feature points to form a first and a second groups of feature points based on the calculated correlations. In some embodiments, a group is formed such that every two feature points in the group have a correlation that is greater than zero. In some embodiments, a group may be formed such that every two feature points in the group have a correlation that is greater than a predetermined value.

In some embodiments, if the distance between two feature points is greater than a predetermined first threshold or if the movement difference between two feature points is greater than a predetermined second threshold, the correlation of the two feature points may be set to zero.

In some embodiments, if $ds_{12}$ is greater than $\sigma_{dis}$ ($ds_{12}>\sigma_{dis}$), the correlation $C_{12}$ may be set to zero.

It should be noted that $\sigma_{dis}$ may be set based on a resolution of the captured video frames. In some embodiments, $\sigma_{dis}$ may be set to a value in the range of $\sqrt{W^2+H^2}/15$ to $\sqrt{W^2+H^2}/10$, where W represents a width of the video frames, and H represents a height of the video frames. The dynamic range of $\sigma_{dis}$ may be changed on the basis of the resolution of the captured video frames.

In some embodiments, if $dv_{12}$ is greater than two times of $\sigma_v$ ($dv_{12}>2\sigma_v$), the correlation $C_{12}$ may be set to zero.

In some embodiments, a, may be set based on the speed of the vehicle. In some embodiments, in case that the vehicle runs at a low speed, e.g., less than or equal to 20 km/h, $\sigma_v$ may be set to a value in the range of 6 to 10.

By doing this, if the two feature points $P_1$ and $P_2$ have a "loose relationship", e.g., $ds_{12}>\sigma_{dis}$ or $dv_{12}>2\sigma_v$, the correlation $C_{12}$ of the two feature points $P_1$ and $P_2$ may not be calculated, thereby the amount of calculation is reduced.

In some embodiments, two different groups may have a common feature point. One embodiment of the present application further provides a method for classifying the common feature point into one of the first and the second group, which is illustrated in S16 to S18.

In S16, identifying a first base point from the first group of feature points which may substantially represent the position and movement of the first group of feature points.

In some embodiments, if a feature point having the greatest sum of correlations may serve as a base point. The base point may substantially represent a position and a movement of the group which the base point belongs to. In some embodiments, if a feature point $P_j$ may substantially represent a group G, it should satisfy energy maximization, which may be expressed as equation (3)

$$\hat{E}_{pj} = \operatorname{argmin}_{p_j} \sum_{p_k \in G} C_{jk} \quad \text{Equation (3)}$$

where 'argmax' stands for the argument of the maximum, that is to say, the set of points of the given argument for which the function $$\sum_{p_k \in G} C_{jk}$$

attains its maximum value.

Figure 2:
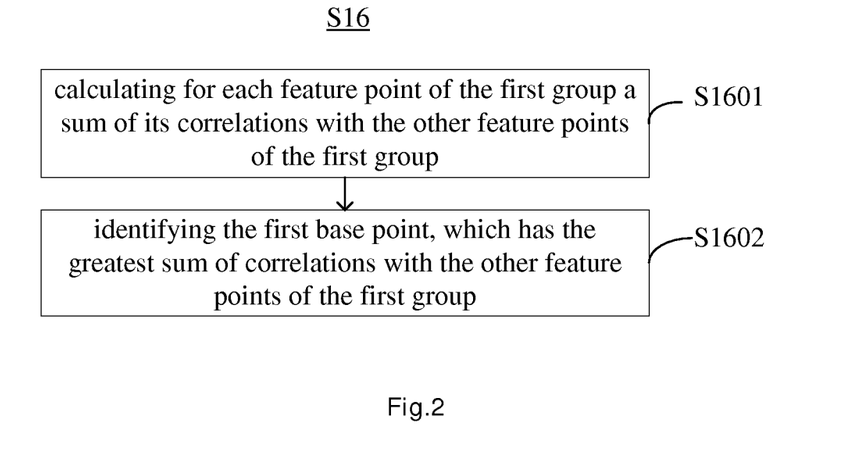
FIG. 2 illustrates a schematic flow chart of a method for identifying a first base point in the first group according to one embodiment of the present application.

FIG. 2 illustrates a schematic flow chart of a method S16 for identifying a first base point in the first group according to one embodiment of the present application. The method S16 includes: in S1601, calculating for each feature point of the first group a sum of its correlations with the other feature points of the first group; in S1602, identifying the first base point, which has the greatest sum of correlations with the other feature points of the first group.

In S17, identifying a second base point from the second group of feature points which may substantially represent the position and movement of the second group of feature points.

Identifying the second base point of the second group is similar to identifying the first base point of the first group, and is not described in detail herein.

Figure 3:
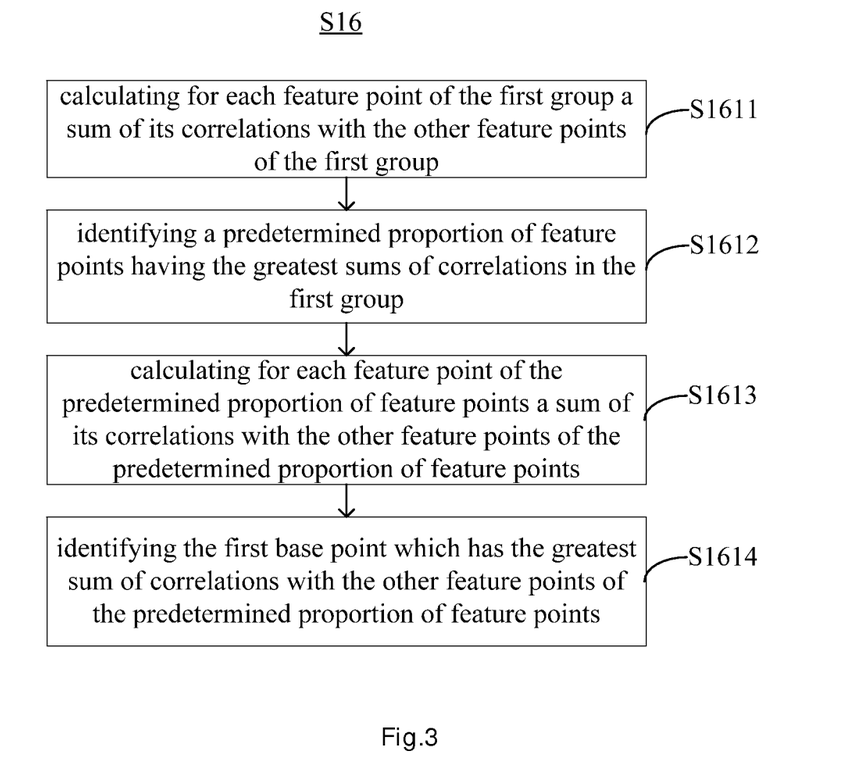
FIG. 3 illustrates a schematic flow chart of a method for identifying a first base point in the first group according to one embodiment of the present application.

Because the video frames may contain some "irrelevant" information, such as noise points, which would affect the accuracy of identifying a base point of a group, thus a more robust method for identifying a base point of a group of feature points is needed. FIG. 3 illustrates a schematic flow chart of another method for identifying the first base point in the first group.

Referring to FIG. 3, in S1611, calculating for each feature point of the first group a sum of its correlations with the other feature points of the first group. For better understanding, it is assumed that the first group includes N feature points.

In S1612, identifying a predetermined proportion of feature points having the greatest sums of correlations in the first group. The value of the proportion may be set according to specific conditions and requirements such as computation load etc. In some embodiments, according to the calculated results in S1611, M feature points having the greatest sums of correlations in the first group may be selected, where M is less than N. In some embodiments, M may be a half of N.

In S1613, calculating for each feature point of the predetermined proportion of feature points a sum of its correlations with the other feature points of the predetermined proportion of feature points. In other words, a sum of correlations of each feature point of the M feature points with the other feature points of the M feature points is calculated.

In S1614, identifying the first base point which has the greatest sum of correlations with the other feature points of the predetermined proportion of feature points. The first base point may substantially represent a position and a movement of the first group.

By S1611 to S1614, interferences caused by noise points may be reduced. It should be noted that S1611 to S1614 can also be used to identify the second base point.

Figure 4:
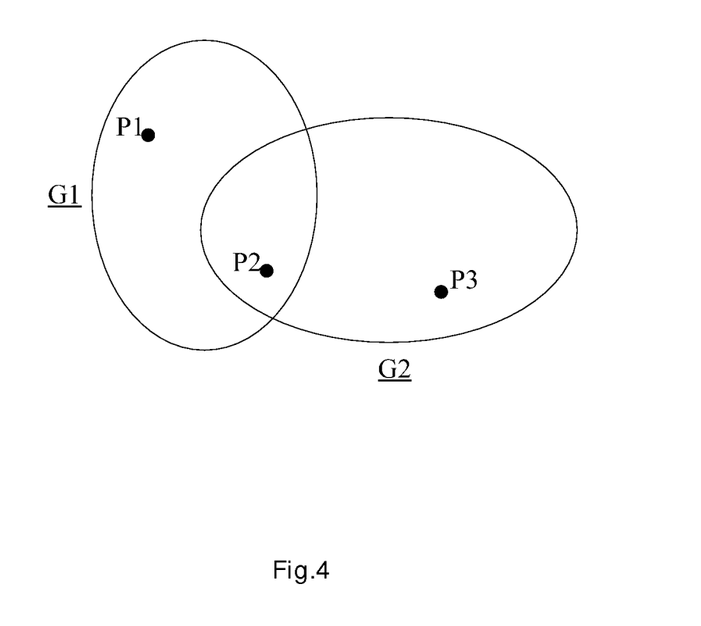
FIG. 4 illustrates an example of two groups of feature points having a common feature point.

FIG. 4 illustrates an example of two groups having a common feature point. Referring to FIG. 4, there are two groups (e.g., G1 and G2), where the feature point P2 is a common feature point of the groups G1 and G2. If two groups of feature points have a common feature point, detected moving objects corresponding to the two groups will have an overlap area. To segment moving objects more clearly, a common feature point needs to be classified into only one group.

Figure 5:
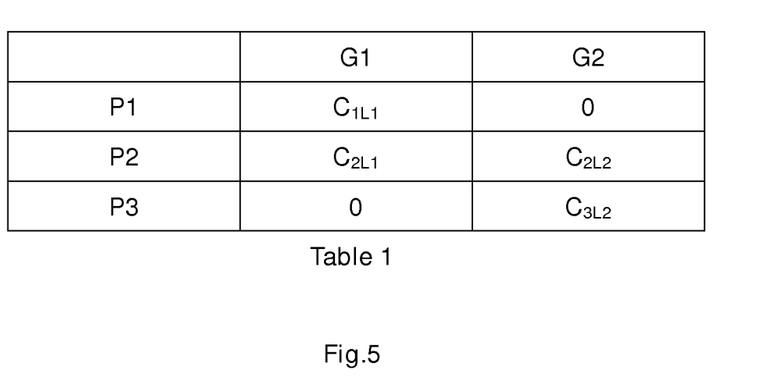
FIG. 5 illustrates table 1 showing correlations of the feature points with base points of the groups as illustrated in FIG. 4.

FIG. 5 illustrates table 1 showing correlations of the feature points P1 to P3 with base points of the two groups as illustrated in FIG. 4. In table 1, L1 and L2 respectively represent base points of the groups G1 and G2. The correlations of P1 to P3 with the groups G1 and G2 may be represented by correlations of P1 to P3 with the base points L1 and L2, respectively.

Take P2 as an example, the correlations of P2 with the two base points L1 and L2 may be $C_{2L1}$ and $C_{2L2}$, which may be calculated using the equation (1). As P2 belongs to the groups G1 and G2, $C_{2L1}$ and $C_{2L2}$ are not equal to zero. $C_{1L2}$ and $C_{3L1}$ are equal to zero as P1 does not belong to the group G2 and P3 does not belong to the group G1.

In S18, classifying the common feature point into one of the first group or the second group whose base point having a larger correlation with the common feature point.

In some embodiments, if a feature point is classified into one of a plurality of groups of which the feature point is a common feature point, it shall satisfy the maximization of correlation, which may be expressed as equation (4):

$$\hat{C}_{pl} = \arg\max_l C_{pl} \qquad \text{Equation (4)}$$

where 'argmax' stands for the argument of the maximum, that is to say, the set of points of the given argument for which the function $C_{pl}$ attains its maximum value; and $C_{pl}$ represents a correlation of a feature point P with a base point of a group which the feature point P belongs to.

In some embodiments, if a plurality of groups have a common feature point, it may be classified into one of the plurality of groups whose base point has the greatest correlation with the common feature point, to obtain a plurality of updated groups having no common feature point.

Figure 6:
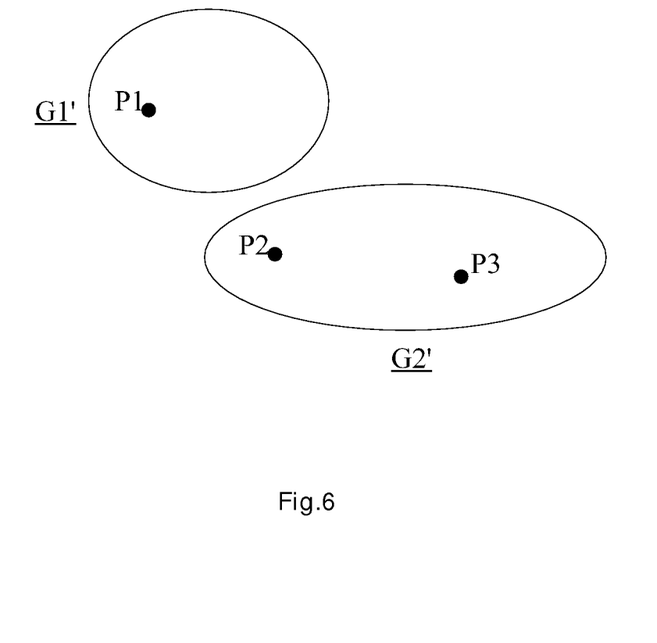
FIG. 6 illustrates an example of two updated groups having no common feature point.

FIG. 6 illustrates an example of two updated groups having no common feature point. For P2, assuming that $C_{2L2}$ is greater than $C_{2L1}$, P2 is identified as belonging to the group G2.

It should be noted that S16 to S18 are optional if there are no common feature point between different groups. In this case, a first and a second moving objects may be identified in at least one video frame according to the first and the second groups of feature points.

In S19, determining whether any of the objects identified based on the updated first and second groups of feature points having no common feature point is static by determining whether these groups of feature points conform to the fundamental matrix.

The inventors of the present application found that applying the fundamental matrix to a group of feature points after the segment of moving objects are finished, the detection rate may be increased, thus the efficiency of moving objects detection is improved.

In some embodiments, if the movements of the first group of feature points conform to the fundamental matrix, the first group of feature points is identified as static points. Otherwise, if the movements of the first group of feature points do not conform to the fundamental matrix, the first group of feature points is identified as moving points. The fundamental matrix may also be applied to the second group of feature points to refine the detection of the second moving object.

For example, the fundamental matrix may be applied to the groups G1', G2' and G3' in FIG. 6. It should be noted S20 is optional if there is no need for refining the detection of moving objects.

In some embodiments, an iterative algorithm may be employed to the method of the present application, so as to refine the detection of moving objects. However, according to experiment results, the inventors of the present application found that the method of the present application without iteration can substantially meet the needs of moving objects detection. Therefore, compared with the conventional art, the load and complexity of computation is significantly reduced and the efficiency of moving objects detection is greatly improved.

The method according to embodiments of the disclosure may be implemented in a moving objects detection system.

In some embodiments, the moving objects detection system may be mounted on a vehicle to detect moving objects in vicinity of the vehicle.

The moving objects detection system may include a camera and a processing device. The camera is adapted for capturing a plurality of video frames. The processing device may be configured to perform the aforementioned methods according to embodiments of the present disclosure. In some embodiments, the processing device may be a CPU, a GPU, a DSP etc, or any combination thereof. In some embodiments, the processing unit may be a combination of a plurality of computing components and other components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for detecting moving objects, comprising:
identifying a plurality of feature points based on a plurality of video frames;
selecting from the plurality of feature points first and second groups of feature points based on correlations between the plurality of feature points;
identifying in at least one video frame two segments based on the first and the second groups of feature points, respectively, as detected moving objects, where a correlation between two feature points comprises a distance component and a movement difference component, where the distance component is related to a distance between the two feature points, and the movement difference component is related to a difference between corresponding movements of the two feature points;
determining that the first and the second groups have a common feature point;
identifying a first base point from the first group that represents the feature points of the first group;
identifying a second base point from the second group that represents the feature points of the second group; and
classifying the common feature point into the first group in response to determining that the first base point of the first group has a larger correlation with the common feature point than the second base point of the second group.

2. The method of claim 1, where a correlation between two feature points is calculated as:

$$C_{12} = \exp\left(-\frac{ds_{12}}{\sigma_{dis}} - \frac{dv_{12}}{\sigma_v}\right)$$

where $C_{12}$ represents a correlation between two feature points $P_1$ and $P_2$;
$ds_{12}$ represents a distance between the two feature points;
$dv_{12}$ represents a movement difference of the two feature points; and
$\sigma_{dis}$ and $\sigma_v$ represent statistical variances of distance and movement, respectively.

3. The method of claim 2, where, if $ds_{12}$ is greater than $\sigma_{dis}$, or if $dv_{12}$ is greater than two times of $\sigma_v$, the correlation $C_{12}$ is set to zero.

4. The method of claim 3, where $\sigma_{dis}$ is set to a value in the range of $\sqrt{W^2+H^2}/15$ to $\sqrt{W^2+H^2}/10$, where W represents a width of the video frames, and H represents a height of the video frames.

5. The method of claim 3, where $\sigma_v$ is set to a value in the range of 6 to 10.

6. The method of claim 1 wherein:
the first base point from the first group of feature points has the greatest sum of correlations with the other feature points of the first group; and
the second base point from the second group of feature points has the greatest sum of correlations with the other feature points of the second group.

7. The method of claim 1 further comprising:
calculating for each feature point of the first group a sum of correlations between the feature point and the other feature points of the first group;
identifying from the first group a predetermined proportion of feature points having the greatest sums of correlations to obtain a third group of feature points;
calculating for each feature point of the third group a sum of correlations between the feature point and the other feature points of the third group;
identifying for the first group a first base point which has the greatest sum of correlations with the other feature points of the third group;
calculating for each feature point of the second group a sum of correlations between the feature point and the other feature points of the second group;
identifying from the second group the predetermined proportion of feature points having the greatest sums of correlations to obtain a fourth group of feature points;
calculating for each feature point of the fourth group a sum of correlations between the feature point and the other feature points of the fourth group;
identifying for the second group a second base point which has the greatest sum of correlations with the other feature points of the fourth group; and
classifying the common feature point into one of the first and the second groups whose base point has a larger correlation with the common feature point to obtain updated first and second groups of feature points.

8. The method of claim 7, where the predetermined proportion is 50%.

9. The method of claim 1, further comprising:
identifying a dominant plane using RANSAC based homography;
calculating a fundamental matrix based on feature points on the dominant plane;
determining that movements of the first and the second groups of feature points conform to the fundamental matrix; and
classifying an object identified based on the group of feature points as a static object.

10. A moving objects detection system comprising:
a camera; and
a processing device configured to:
identify a plurality of feature points based on a plurality of video frames captured by the camera;
select from the plurality of feature points first and second groups of feature points based on correlations between the plurality of feature points;
identify in at least one video frame two segments based on the first and the second groups of feature points, respectively, as detected moving objects, where a correlation between two feature points comprises a distance component and a movement difference component, where the distance component is related to a distance between the two feature points, and the movement difference component is related to a difference between corresponding movements of the two feature points;

determine that the first and the second groups have a common feature point;

identify a first base point from the first group that represents the feature points of the first group;

identify a second base point from the second group that represents the feature points of the second group; and classify the common feature point into the first group in response to determining that the first base point of the first group has a larger correlation with the common feature point than the second base point of the second group.

11. The moving objects detection system of claim 10, where a correlation between two feature points is calculated as:

$$C_{12} = \exp\left(-\frac{ds_{12}}{\sigma_{dis}} - \frac{dv_{12}}{\sigma_v}\right)$$

where $C_{12}$ represents a correlation between two feature points $P_1$ and $P_2$;

$ds_{12}$ represents a distance between the two feature points;

$dv_{12}$ represents a movement difference of the two feature points; and $\sigma_{dis}$ and $\sigma_v$ and a represent statistical variances of distance and movement, respectively.

12. The moving objects detection system of claim 11, where if $ds_{12}$ is greater than $\sigma_{dis}$, or if $dv_{12}$ is greater than two times of $\sigma_v$, the correlation $C_{12}$ is set to zero.

13. The moving objects detection system of claim 12, where $\sigma_{dis}$ is set to a value in the range of $\sqrt{W^2+H^2}/15$ to $\sqrt{W^2+H^2}/10$, where W represents a width of the video frames, and H represents a height of the video frames.

14. The moving objects detection system of claim 12, where $\sigma_v$ is set to a value in the range of 6 to 10.

15. The moving objects detection system of claim 10, wherein:

the first base point from the first group of feature points has the greatest sum of correlations with the other feature points of the first group; and the second base point from the second group of feature points has the greatest sum of correlations with the other feature points of the second group.

16. The moving objects detection system of claim 10, where the processing device is further configured to:

calculate for each feature point of the first group a sum of correlations between the feature point and the other feature points of the first group;

identify from the first group a predetermined proportion of feature points having the greatest sums of correlations to obtain a third group of feature points;

calculate for each feature point of the third group a sum of correlations between the feature point and the other feature points of the third group;

identify for the first group a first base point which has the greatest sum of correlations with the other feature points of the third group;

calculate for each feature point of the second group a sum of correlations between the feature point and the other feature points of the second group;

identify from the second group the predetermined proportion of feature points having the greatest sums of correlations to obtain a fourth group of feature points;

calculate for each feature point of the fourth group a sum of correlations between the feature point and the other feature points of the fourth group;

identify for the second group a second base point which has the greatest sum of correlations with the other feature points of the fourth group; and classify the common feature point into one of the first and the second groups whose base point has a larger correlation with the common feature point to obtain updated first and second groups of feature points.

17. The moving objects detection system of claim 16, where the predetermined proportion is 50%.

18. The moving objects detection system of claim 10, where the processing device is further configured to:

identify a dominant plane using RANSAC based homography;

calculate a fundamental matrix based on feature points on the dominant plane;

determine that movements of the first and the second groups of feature points conform to the fundamental matrix; and classify an object identified based on the group of feature points as a static object.

19. A non-transitory computer-readable medium storing program instructions that, when executed by a processor, cause the processor to perform the steps of:

identifying a plurality of feature points based on a plurality of video frames;

selecting from the plurality of feature points first and second groups of feature points based on correlations between the plurality of feature points;

identifying in at least one video frame two segments based on the first and the second groups of feature points, respectively, as detected moving objects, where a correlation between two feature points comprises a distance component and a movement difference component, where the distance component is related to a distance between the two feature points, and the movement difference component is related to a difference between corresponding movements of the two feature points;

determining that the first and the second groups have a common feature point;

identifying a first base point from the first group that represents the feature points of the first group;

identifying a second base point from the second group that represents the feature points of the second group; and classifying the common feature point into the first group in response to determining that the first base point of the first group has a larger correlation with the common feature point than the second base point of the second group.

20. A method for detecting moving objects, comprising:

identifying a plurality of feature points based on a plurality of video frames;

selecting from the plurality of feature points first and second groups of feature points based on correlations between the plurality of feature points; and identifying in at least one video frame two segments based on the first and the second groups of feature points, respectively, as detected moving objects, where a correlation between two feature points comprises a distance component and a movement difference component, where the distance component is related to a distance between the two feature points, and the movement difference component is related to a difference between corresponding movements of the two feature points;

where the correlation between two feature points is calculated as:

$$C_{12} = \exp\left(-\frac{ds_{12}}{\sigma_{dis}} - \frac{dv_{12}}{\sigma_v}\right)$$

where $C_{12}$ represents a correlation between two feature points $P_1$ and $P_2$;

$ds_{12}$ represents a distance between the two feature points;

$dv_{12}$ represents a movement difference of the two feature points; and $\sigma_{dis}$ and $\sigma_v$ represent statistical variances of distance and movement, respectively.

* * * * *

UNITED STATES PATENT AND TRADEMARK OFFICE
CERTIFICATE OF CORRECTION

Page 1 of 1

PATENT NO. : 9,852,341 B2
APPLICATION NO. : 14/765546
DATED : December 26, 2017
INVENTOR(S) : Yun Zhou et al.

It is certified that error appears in the above-identified patent and that said Letters Patent is hereby corrected as shown below:

On the Title Page (73) Assignee:
Please delete "HARMAN INTERNATIONAL INDUSTRIES, INCORPORATION" and insert
--HARMAN INTERNATIONAL INDUSTRIES, INC.--.

Signed and Sealed this
Sixteenth Day of July, 2019

Andrei Iancu
*Director of the United States Patent and Trademark Office*